(12) United States Patent
Nguyen et al.

(10) Patent No.: US 7,934,211 B2
(45) Date of Patent: Apr. 26, 2011

(54) MULTI-LEVEL PATCHING OPERATION

(75) Inventors: PhiDien Ha Nguyen, San Jose, CA (US); Shamik Ganguly, Bangalore, IN (US); Debashis Saha, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1126 days.

(21) Appl. No.: 11/174,069

(22) Filed: Jun. 30, 2005

(65) Prior Publication Data

US 2007/0006209 A1 Jan. 4, 2007

(51) Int. Cl.
*G06F 9/44* (2006.01)
*G06F 9/445* (2006.01)

(52) U.S. Cl. ........ 717/168; 717/169; 717/170; 717/171; 717/172; 717/173; 717/174

(58) Field of Classification Search .......................... None
See application file for complete search history.

(56) References Cited

U.S. PATENT DOCUMENTS

| | | | |
|---|---|---|---|
| 5,495,610 A | 2/1996 | Shing et al. | |
| 6,006,034 A | 12/1999 | Heath et al. | |
| 6,052,531 A | 4/2000 | Walden, Jr. et al. | |
| 6,349,407 B1 | 2/2002 | Towfiq | |
| 6,425,126 B1 | 7/2002 | Branson et al. | |
| 6,438,749 B1 | 8/2002 | Chamberlain | |
| 6,526,574 B1 | 2/2003 | Jones | |
| 6,535,894 B1 | 3/2003 | Schmidt et al. | |
| 6,990,660 B2 | 1/2006 | Moshir et al. | |
| 7,127,712 B1 * | 10/2006 | Noble et al. | 717/173 |
| 7,412,700 B2 * | 8/2008 | Lari et al. | 717/175 |
| 2003/0050932 A1 * | 3/2003 | Pace et al. | 707/100 |
| 2003/0218628 A1 * | 11/2003 | Deshpande et al. | 345/738 |
| 2004/0015942 A1 | 1/2004 | Branson et al. | |
| 2004/0210653 A1 * | 10/2004 | Kanoor et al. | 709/223 |
| 2006/0294430 A1 * | 12/2006 | Bunker et al. | 714/38 |
| 2007/0038991 A1 * | 2/2007 | Schuft et al. | 717/172 |

OTHER PUBLICATIONS

Opatch Users Guide, 2003.*
Michael Zampiceni, Oracle Universal Installer and Opatch User's Guide, Apr. 2009.*
Sivakumar Seshadri, Oracle Universal Installer and OPatch User's Guide, Jun. 2005, 168 pages.*
Alain Trottier, Sun Java 2 Enterprise edition (J2EE) Web component developer exam: exam 310-080, Que Publishing, Nov. 2002, 508 pages, 3 pages provided.*
Sean Brydon, Carla Mott, Packaging Utility Classes or Library JAR Files in a Portable J2EE Application, Mar. 1, 2005, 6 Pages.*

(Continued)

*Primary Examiner* — Hyung S Sough
*Assistant Examiner* — Kimberly Jordan
(74) *Attorney, Agent, or Firm* — Varun A. Shah; Hickman Palermo Truong & Becker LLP

(57) ABSTRACT

Techniques for performing a multi-level patching operation are described. According to one such technique, before a particular patch is applied, the data containers that are targeted by the particular patch are identified. A determination is made as to whether any of these target data containers already has been targeted by any previously applied patch. A determination also is made as to whether any other data container that contains (immediately or otherwise) any of the target data containers already has been targeted by any previously applied patch. If any target data container or any other data container that contains a target data container already has been targeted by a previously applied patch, then the particular patch is not applied to the target data containers.

16 Claims, 3 Drawing Sheets

OTHER PUBLICATIONS

Matt Albrecht; http://web.archive.org/web/20050209073452/http://groboutils.sourceforge.net/codecoverage/v2_antdoc_grobo-rezip.html; Feb 9, 2005; 3 pages.*

Thomas Weidenfeller, Java—Make and execute .jar-file, forum post velocityreviews.com, Apr. 20, 2005, 3 pages.*

TDB-ACC-NO: NNRD412102, Disclosure Title: "System for Service Level Identification in Client/Server WWW/Java Environment", Research Disclosure, Aug. 1998, UK. 6 pages, retrieved form EAST V 2.0.1.4, Nov. 22, 2004.

Pugh, William; "Compressing Java Class Files", pp. 247-258, 1999 ACM database, Jan. 13, 2005.

"Updating a JAR File", 3 pages, retrieved from <URL http://java.sun.com/docs/books/tutorial/jar/basics/update.html>, retrieved Jan. 13, 2005.

Retrologic Systems RetroGuard Java Obfuscation:, retrieved from google.com search , <URL http://www.retrologic.com/rg-docspatchadv.html>, Jan. 13, 2005.

U.S. Appl. No. 11/173,838, filed Jun. 30, 2005, Final Office Action, mail date Apr. 12, 2010.

* cited by examiner

MULTI-LEVEL PATCHING OPERATION

FIELD OF THE INVENTION

The present invention relates to automated software-updating systems. The invention relates more specifically to a multi-level patching operation.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

After a computer program has been released for sale to the public, and consumers have purchased and installed the program on their computer, updates to the computer program may become available. Such updates may fix errors in the previously released program, or add enhanced features that were not present in the previously released program. Such updates are often supplied to consumers in the form of another customized program that applies changes to the binary code of the previously released program. Often, the changes applied to the binary code do not completely replace the binary code, but only alter portions thereof. The process of applying updates to portions of a previously released program, instead of replacing the program entirely, is called "patching," and the updates that are applied are called "patches."

Separate groups or organizations, which do not necessarily coordinate their efforts with each other, may author different patches that target the same files of a computer program. For example, one group may author one patch that, when applied, replaces previous versions of files "A" and "B" with different versions of those files, and another group may author another patch that, when applied, replaces versions of files "B" and "C" with different versions of those files. If both patches are applied to the target files, then, unless the later-applied patch duplicates the effects of the earlier-applied patch relative to file "B" (which is unlikely), the application of the later-applied patch will obliterate the effects of the application of the earlier-applied patch relative to file "B." This is an undesirable outcome.

The problem described above becomes more complicated when the files targeted by the patches are nested within archives, which may be nested within yet other archives, at any number of levels. For example, it is common for multiple Java class files to be nested within a Java Archive (JAR) file. Several JAR files may be nested within a Web Archive (WAR) file. Several WAR files may be nested within an Enterprise Archive (EAR) file. One patch, when applied, might replace multiple Java class files that are distributed among different JAR files. Another patch, when applied, might replace an entire WAR file. If the WAR file contains a JAR file that contains a particular Java class file that is targeted by the former patch, and if the latter patch is applied after the former patch is applied, then the application of the latter patch will obliterate the effects of the application of the former patch relative to the particular Java class file.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques for performing a multi-level patching operation are described. According to one such technique, before a particular patch is applied, the files, archives, and/or other data containers that are targeted by the particular patch are identified. The term "file" as used herein includes class files. The term "data container" as used herein includes "EAR," "WAR," and "JAR" files, which contain other files and/or data containers. A determination is made as to whether any of these target data containers already has been targeted, previously, by any other patch that was applied. A determination also is made as to whether any other data container that contains (immediately or otherwise) any of the target data containers already has been targeted, previously, by any other patch that was applied.

If none of the target data containers and none of the other data containers that contain a target data container have been targeted, previously, by another patch that was applied, then the particular patch is applied to the target data containers. Alternatively, if any target data container or any other data container that contains a target data container already has been targeted, previously, by another patch that was applied, then the particular patch is not applied to the target data containers.

Thus, patches are applied atomically. Unless a patch can be applied to all of the data containers that the patch targets, without obliterating any of the effects of all previously applied patches, the patch is not applied to any of the data containers that the patch targets.

The techniques described herein may be used within a multi-node system. The data containers that a patch targets may be distributed among separate nodes of the multi-node system.

According to one technique, after a patch has been applied to a set of target data containers, metadata, which identifies each target data container that the patch targeted, is stored. Thereafter, prior to the application of another patch, this metadata can be used to determine whether any previously applied patch already has targeted a data container, as described above.

Preventing Patch Conflicts

Figure 1:
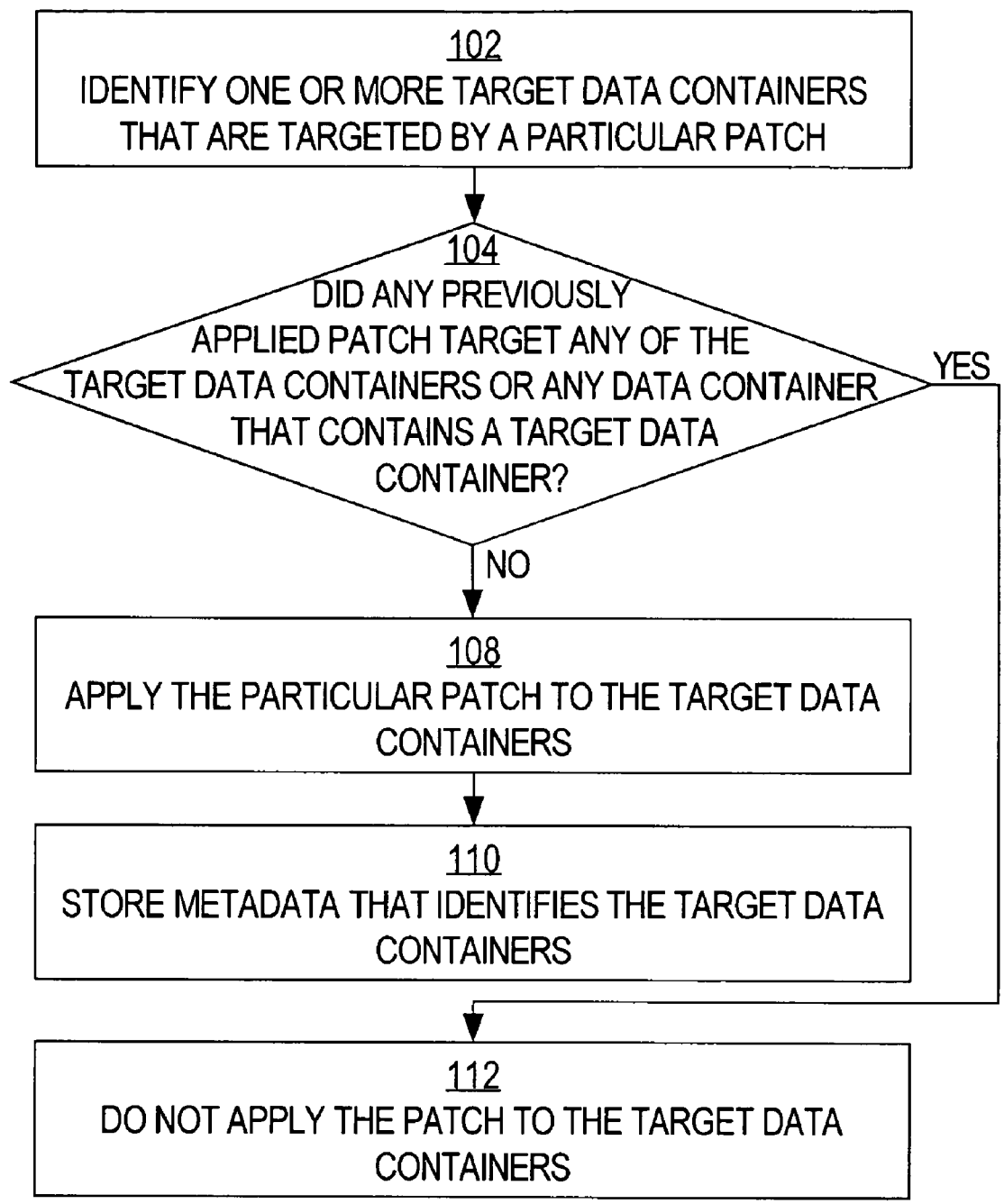
FIG. 1 is a flow diagram that illustrates a technique for preparing to perform a patching operation in manner that prevents patch conflicts, according to an embodiment of the invention.

FIG. 1 is a flow diagram that illustrates a technique for preparing to perform a patching operation in manner that prevents patch conflicts, according to an embodiment of the invention. A patching program that executes on a computer may perform the illustrated technique in an automated way, for example.

In block 102, one or more target data containers (e.g., files, archives, database tables, database objects, etc.) that are targeted by a particular patch are identified. For example, a patching program may read metadata that is associated with the particular patch and that identifies each target data container that the patch will replace when applied. Such metadata may identify, in a hierarchical manner, each other data container that contains such a target data container.

For example, assuming that the particular patch targets a Java class file named "oracle/xml/oraclexml.class," which is contained within a JAR file named "c/d/xsu12.jar," which is contained within a WAR file named "a/b/oracle2.war," which is contained within an EAR file named "rdbms/jlib/oracle1.ear," the metadata might be:

<jar name="oracle1.ear:oracle2.war:xsu12.jar"
       path="%ORACLE_HOME%/rdbms/jlib"
       class_name="rdbms/jlib/oracle1.ear/a/b/oracle2.war/c/
       d/xsu12.jar/oracle/xml/ oraclexml.class"/>.

According to one embodiment of the invention, only a data container that is going to be entirely replaced by the application of a patch is considered to be "targeted" by the patch; other higher-level data containers that contain the to-be-replaced data container are not considered to be "targeted" by the patch unless those higher-level data containers also are going to be entirely replaced by the application of the patch (in which case there would be no need for the patch to target any of the lower-level data containers contained within). In the example above, the patch targets the Java class file, but not the JAR file, the WAR file, or the EAR file that contain the Java class file.

Patches can target such higher-level data containers, however. For example, a single patch may target one or more EAR files, one or more WAR files that are not contained within any of those EAR files, one or more JAR files that are not contained within any of those WAR files or EAR files, and one or more Java class files that are not contained within any of those JAR files, WAR files, or EAR files.

In block 104, it is determined whether any previously applied patch targeted any of the target data containers or any other data container that contains (immediately or otherwise) any of the target data containers. For example, a patching program may read previously stored metadata to determine that patches "P1" and "P2" had been applied to one or more data containers previously; any patches that were not actually applied do not need to be considered. The patching program may determine, from this metadata, that patch "P1" targeted data container "A.class," and that patch "P2" targeted data container "B.war," for example. The patching program may further determine, for each other data container that contains a target data container, whether a previously applied patch targeted that other data container. For example, if a to-be-applied patch "P3" targets data container "C.class," and if previously applied patch "P2" targeted data container "B.war" which contains "D.jar" which contains "C.class," then the patching program concludes that at least one previously applied patch targeted a data container that contains a target data container.

However, in the above example, if the previously applied patch "P2" had targeted a data container "E.class" in "D.jar" instead of targeting "B.war," then this alone would not cause the patching program to conclude that a previously applied patch targeted a data container that contains a target data container. This is so even though "C.class" and "E.class" are both in data containers "D.jar" and "B.war," because it would be "E.class" that was previously targeted by patch "P2," and not "D.jar" or "B.war." If any previously applied patch targeted (a) a data container that is also targeted by the particular patch, or (b) any other data container that contains any of the data containers that are targeted by the particular patch, then control passes to block 112. Otherwise, control passes to block 108.

In block 108, the particular patch is applied to the target data containers. For example, if a patch "P3" targets a data container "C.class," then a patching program may replace the existing version of "C.class" with a new version of "C.class" that is contained in patch "P3." In one embodiment, this replacement involves un-archiving the existing version of the target data container from the "parent" data container that contains the target data container, copying over the existing version of the target data container with the new version of the target data container, and then archiving the new version of the target data container back into the "parent" data container. Control passes to block 110.

In block 110, metadata, which identifies the target data containers, is stored. For example, after applying a patch "P3" to a data container "C.class," a patching program may store metadata that indicates that patch "P3" targeted data container "C.class." Thereafter, the patching program may use the stored metadata to make the determinations described in blocks 104 and 106 above relative to future patches. The metadata may indicate the full hierarchical "path" of the target data containers, including the identities of all untargeted higher-level data containers that contain the target data containers.

Alternatively, in block 112, the patch is not applied to the target data containers. For example, the patching program may refrain from applying the patch to any of the target data containers. Thus, patches are applied in an atomic manner; either a patch is applied to all of the data containers that the patch targets, or the patch is not applied to any data container at all. Because the foregoing technique prevents a patch from being applied if the patch targets any data container that was targeted by a previously applied patch or if the patch targets any data container that contains a data container that was targeted by a previously applied patch, the foregoing technique prevents later patches from obliterating the effects of earlier-applied patches.

In one embodiment of the invention, if the patch is not applied, as described in block 112, then the identities of the target data containers that were targeted by previously applied patches are automatically determined and disclosed to a user of a patching program. In one embodiment of the invention, if the patch is not applied, as described in block 112, then the identities of the previously applied patches that targeted any of the target data containers are automatically determined and disclosed to a user of a patching program. According to one embodiment of the invention, the identities of the previously targeted target data containers and the previously applied patches that targeted the target data containers may be determined from metadata that is stored as described above in block 110.

Example Container Tree

Figure 3:
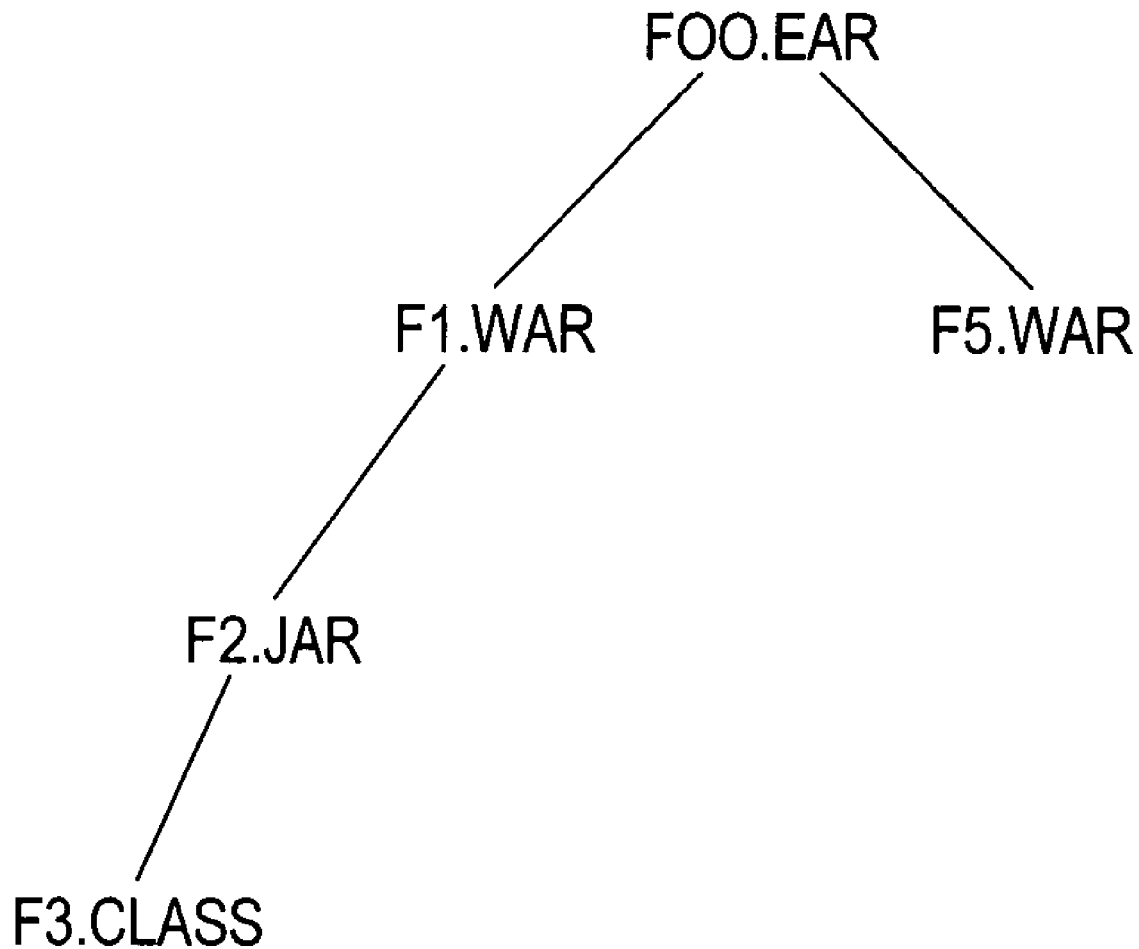
FIG. 3 is a block diagram that illustrates an example container tree on which patching operations may be performed.

FIG. 3 is a block diagram that illustrates an example container tree on which patching operations may be performed. A container "foo.ear" contains containers "f1.war" and "f5.war." Container "f1.war" contains container "f2.jar." Container "f2.jar" contains file "f3.class." Assuming that a patch P1 targeted only "f5.war," and that a patch P2 targeted only "f3.class," there would be no conflict between patch P1 and patch P2 using embodiments of the invention described herein, because neither patch P1 nor patch P2 targets "foo.jar."

Distributed Patching Operations

In some circumstances, a patch may target data containers that are distributed among separate nodes of a multi-node system. For example, a patch may target a first data container that is stored on a first computer, and the same patch may target a second data container that is stored on a second computer. The techniques described above may be used in such multi-node systems to avoid patch conflicts.

For example, metadata that indicates which data containers already have been targeted by previously applied patches may be stored on a special "system" node, regardless of the nodes on which the data containers reside. Any time that a new patch is to be applied, a patching program may consult the metadata that is stored on the system node. If the metadata indicates that a previously applied patch already has targeted any data container targeted by the new patch, or that a previously applied patch already has targeted any data container that contains any data container targeted by the new patch, then the patching program may refrain from applying the new patch to any of the target data containers. The patching program may do so even if two or more of the target data containers reside on separate nodes.

When the patching program applies a patch to target data containers that reside on separate nodes, the patching program may update the metadata that is stored on the system node to indicate that the target data containers were targeted by a patch that was applied. Thereafter, the patching program may use the stored metadata to make the determinations described above relative to future patches.

According to one embodiment of the invention, a patching tool determines that there are no conflicts between two different patches that target the same files or data containers on the same node if the patches apply to different namespaces.

Hardware Overview

Figure 2:
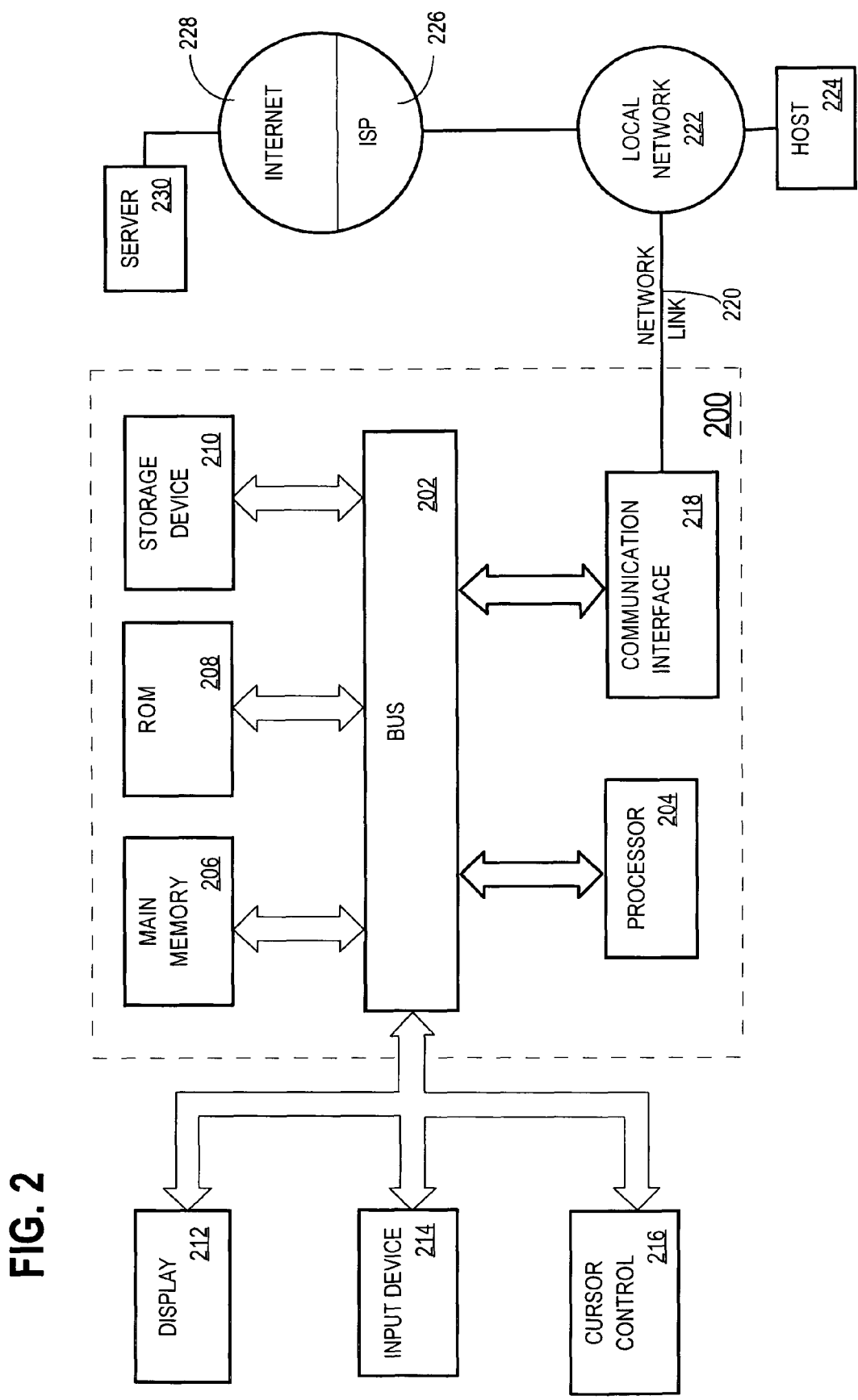
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   identifying a hierarchical path to one or more target class files that are to be replaced by a particular patch of a plurality of patches;
   wherein the hierarchical path identifies at least one archive file that is not to be replaced, as a whole, by the particular patch;
   wherein said one or more target class files are, at a time that said identifying is performed, contained within the at least one archive file;
   determining whether any patch in the plurality of patches, other than the particular patch, has already targeted and been applied to the at least one archive file; and
   responsive to, at least, determining that no patch in the plurality of patches, other than the particular patch, has already targeted and been applied to the at least one archive file, applying the particular patch to the one or more target class files;
   wherein the steps are performed by one or more computing devices.

2. The method of claim 1, further comprising:
   responsive to determining that any patch in the plurality of patches, other than the particular patch, has already targeted and been applied to the at least one archive file, generating information that identifies one or more patches that already have been applied to the at least one archive file.

3. The method of claim 1, further comprising:
   responsive to determining that any patch in the plurality of patches, other than the particular patch, has already targeted and been applied to the at least one archive file, generating information that identifies one or more archive files to which any patch other than the particular patch already has been applied.

4. The method of claim 1,
   wherein the one or more target class files are a first set of one or more target class files;
   wherein the at least one archive file is a first archive file residing at a first node of a multi-node system;
   wherein the method further comprises:
   identifying a second set of one or more target class files that will be replaced by the particular patch;
   wherein said second set of one or more target class files is, at a time that said identifying the second set is performed, contained within a second archive file at a second node of the multi-node system; and
   determining whether any patch in the plurality of patches, other than the particular patch, has already targeted and been applied to the second archive file;
   wherein applying the particular patch to the first set of the one or more target class files is further performed responsive to at least determining that no patch in the plurality of patches, other than the particular patch, has already targeted and been applied to the second archive file;
   wherein the first node is different than the second node.

5. The method of claim 1, wherein the at least one archive file is one of a Java archive file, web archive file, or enterprise archive file.

6. The method of claim 1, wherein the at least one archive file is a first archive file contained within a second archive file, the method further comprising:
   determining whether any patch in the plurality of patches, other than the particular patch, has already targeted and been applied to the second archive file;
   wherein applying the particular patch to the one or more target class files is further performed responsive to at least determining that no patch in the plurality of patches, other than the particular patch, already has targeted and been applied to the second archive file.

7. The method of claim 1, wherein applying the patch to the one or more target class files comprises:
   expanding the at least one archive file into a directory structure;
   patching the one or more target class files within the directory structure; and
   collapsing the directory structure back into the at least one archive file.

8. The method of claim 1, wherein the at least one archive file contains one or more files in addition to the one or more target class files.

9. A volatile or non-volatile computer-readable medium storing instructions that, when executed by one or more computing devices, cause:
   identifying a hierarchical path to one or more target class files that are to be replaced by a particular patch of a plurality of patches;

wherein the hierarchical path identifies at least one archive file that is not to be replaced, as a whole, by the particular patch;

wherein said one or more target class files are, at a time that said identifying is performed, contained within the at least one archive file;

determining whether any patch in the plurality of patches, other than the particular patch, has already targeted and been applied to the at least one archive file; and responsive to, at least, determining that no patch in the plurality of patches, other than the particular patch, has already targeted and been applied to the at least one archive file, applying the particular patch to the one or more target class files.

10. The volatile or non-volatile computer-readable medium of claim 9, wherein the instructions, when executed by the one or more computing devices, further cause:

responsive to determining that any patch in the plurality of patches, other than the particular patch, has already targeted and been applied to the at least one archive file, generating information that identifies one or more patches that already have been applied to the at least one archive file.

11. The volatile or non-volatile computer-readable medium of claim 9, wherein the instructions, when executed by the one or more computing devices, further cause:

responsive to determining that any patch in the plurality of patches, other than the particular patch, has already targeted and been applied to the at least one archive file, generating information that identifies one or more archive files to which any patch other than the particular patch already has been applied.

12. The volatile or non-volatile computer-readable medium of claim 9, wherein the one or more target class files are a first set of one or more target class files;

wherein the at least one archive file is a first archive file residing at a first node of a multi-node system;

wherein the instructions, when executed by the one or more computing devices, further cause:

identifying a second set of one or more target class files that will be replaced by the particular patch;

wherein said second set of one or more target class files is, at a time that said identifying the second set is performed, contained within a second archive file at a second node of the multi-node system;

determining whether any patch in the plurality of patches, other than the particular patch, has already targeted and been applied to the second archive file; and wherein applying the particular patch to the first set of the one or more target class files is further performed responsive to at least determining that no patch in the plurality of patches, other than the particular patch, already has targeted and been applied to the second archive file wherein the first node is different than the second node.

13. The volatile or non-volatile computer-readable medium of claim 9, wherein the at least one archive file is one of a Java archive file, web archive file, or enterprise archive file.

14. The volatile or non-volatile computer-readable medium of claim 9, wherein the at least one archive file is a first archive file contained within a second archive file, wherein the instructions, when executed by the one or more computing devices, further cause:

determining whether any patch in the plurality of patches, other than the particular patch, has already targeted and been applied to the second archive file;

wherein applying the particular patch to the one or more target class files is further performed responsive to at least determining that no patch in the plurality of patches, other than the particular patch, already has targeted and been applied to the second archive file.

15. The volatile or non-volatile computer-readable medium of claim 9, wherein applying the patch to the one or more target class files comprises:

expanding the at least one archive file into a directory structure;

patching the one or more target class files within the directory structure; and collapsing the directory structure back into the at least one archive file.

16. The volatile or non-volatile computer-readable medium of claim 9, wherein the at least one archive file contains one or more files in addition to the one or more target class files.

\* \* \* \* \*

UNITED STATES PATENT AND TRADEMARK OFFICE
CERTIFICATE OF CORRECTION

PATENT NO. : 7,934,211 B2  Page 1 of 1
APPLICATION NO. : 11/174069
DATED : April 26, 2011
INVENTOR(S) : Nguyen et al.

It is certified that error appears in the above-identified patent and that said Letters Patent is hereby corrected as shown below:

On Title Page 2, in column 1, under "Other Publications", line 8, delete "form" and insert -- from --, therefor.

In column 10, line 11, in Claim 12, after "file" insert -- ; --.

Signed and Sealed this
Eighteenth Day of October, 2011

David J. Kappos
*Director of the United States Patent and Trademark Office*